United States Patent [19]

Maricic

[11] 4,204,712
[45] May 27, 1980

[54] VEHICLE DECKING BEARER

[75] Inventor: Alexander Maricic, Newcastle, Australia

[73] Assignee: John Lysaght (Australia) Limited, Sydney, Australia

[21] Appl. No.: 935,813

[22] Filed: Aug. 22, 1978

[30] Foreign Application Priority Data

Aug. 29, 1977 [AU] Australia .............................. PD1429

[51] Int. Cl.² ........................................... B62D 33/00
[52] U.S. Cl. .................................... 296/35.1; 105/419
[58] Field of Search ..................... 296/35 R, 181, 182, 296/9; 105/413, 417, 419

[56] References Cited

U.S. PATENT DOCUMENTS

| | | | |
|---|---|---|---|
| 983,263 | 2/1911 | Becker | 105/419 |
| 2,363,172 | 11/1944 | Franks | 296/35 R |
| 3,028,193 | 4/1962 | Haan | 296/35 R |

Primary Examiner—Robert R. Song
Attorney, Agent, or Firm—Beveridge, DeGrandi, Kline & Lunsford

[57] ABSTRACT

A vehicle decking bearer, by comparison with existing bearers, is better able to withstand the stresses due to normal work loadings, and is more easily incorporated in a vehicle structure, by reason of it consisting of a Z-sectioned longitudinal runner and a plurality of bolting stations by which it is U-bolted to the vehicle chassis. Each of the bolting stations comprises a bolt-hole able to receive the crotch of a U-bolt and located substantially in or near the neutral axis of the runner, and a bridge member secured to the runner so that a web portion of it, upon which the mentioned crotch rests, horizontally intersects said bolt-hole.

7 Claims, 7 Drawing Figures

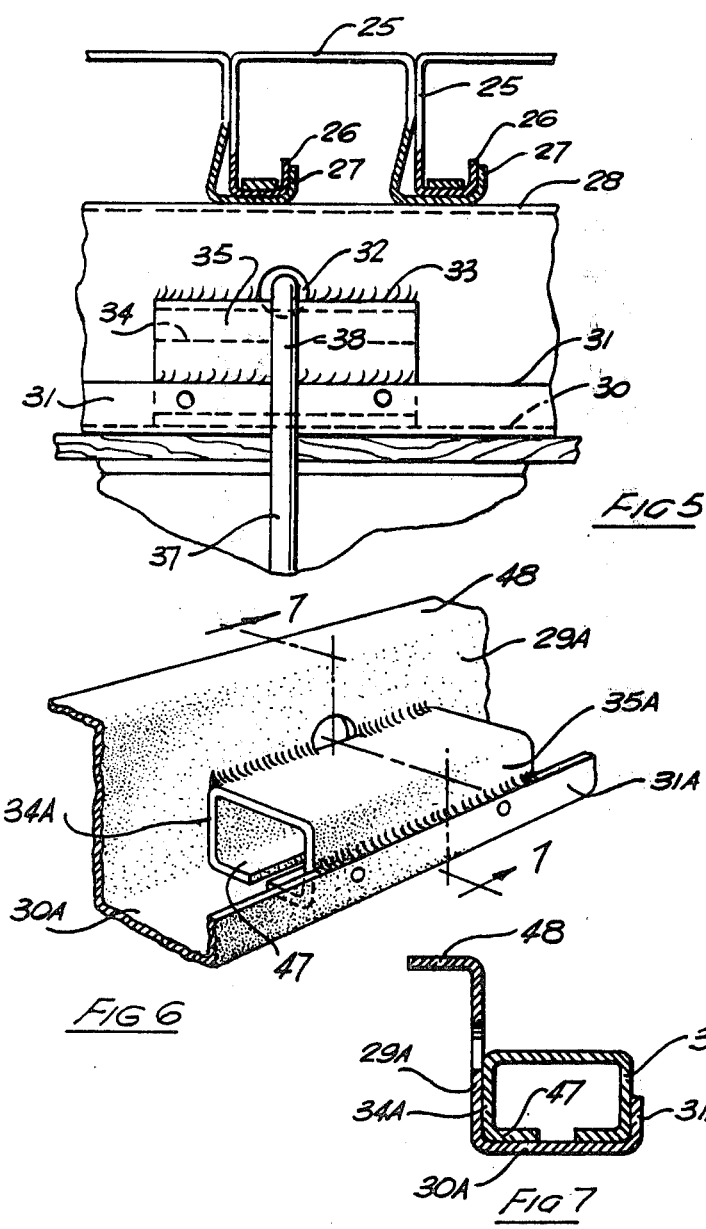

VEHICLE DECKING BEARER

BACKGROUND OF THE INVENTION

This invention relates to vehicle deckings of the kind composed of a plurality of channels laid and fixed side-by-side, with their webs uppermost, on and crosswise of bearers secured to and running longitudinally of the chassis or frame members of the vehicle.

A typical decking assembly of the known kind referred to above, is schematically shown, in end elevation, in FIG. 1 of the drawings herewith. The decking channels 10 are fixed, by bolting or riveting (as indicated at 11) to the bearers 12 (of channel or "C" section); and these, in turn, are secured to the chassis members 13, usually with a pad or insert of hardwood or other suitable material sandwiched between them as indicated at 14.

The prior arrangement, as shown in FIG. 1, is unsatisfactory in several ways:

(A) The holes for the fastenings indicated at 11 cannot be readily drilled with the parts assembled, because the virtually continuous upper surface of the decking forbids drill access from above; and drilling upwardly, from between the flanges of the bearers, while not impossible, is at best most inconvenient.

(B) Since the lateral spacing of the chassis members 13 is predetermined, that of the bearers 12 is similarly predetermined, and this in turn sets a limit on the permissible cantilever overhang of the decking as indicated by span 15 in FIG. 1. In this connection experience has shown that with uniformly distributed overloading of the decking (of customary decking width) yield or failure of the decking is almost invariably manifested as downward bending of the cantilevered portions of the decking about the supports constituted by the bearers.

(C) With the conventional channel or "C" sectioned bearers (such as 12) there is a tendency for the chassis members (13) to twist when under severe loading conditions due to the vertical axis of maximum load intensity being relatively widely spaced from the vertical shear axis of the chassis member. This is illustrated in FIG. 1, where line 16 represents the vertical plane which contains the shear centre of the chassis member and the span 17 indicates the spacing of that centre relative to the line of maximum loading. In other words, the chassis member, viewed as a column, is under substantial eccentric loading.

(D) When cantilever failure of the decking occurs and is accompanied by deformation of the bearer, the nature of the failure is as shown (exaggeratedly) in FIG. 2 of the drawings herewith. Referring to that figure, experience has shown that strain is manifested as a reduction of the 90° angle between the bearer web 18 and the bottom flange 19, while the 90° angle between the web and the top flange 20 maintains its rectangularity. The result of this is the imposition of a line-contact concentrated loading at the point indicated at 21. This change in loading conditions (from a load distributed over the upper surface of flange 20 to a concentrated load at the point 21) causes local and permanent deformation of the decking members in the vicinity of point 21. And this local deformation arises even where the members concerned are, in all other respects, harmlessly strained within their elastic limits.

(E) The bearers (such as 12) have to be firmly secured to the chassis members (such as 13). This may be done by direct bolting together of the flanges 19 and 22 (if the chassis members are open-sided channels, as distinct from box members) or by the use of U-bolts and clamping plates as indicated at 23 and 24 in FIG. 1. If direct bolting is employed the drilling access disability referred to above is again encountered; moreover, the bolt-holes (in the flanges 19 and 22) are necessarily detrimentally distant from the neutral axes of the members so joined together. If U-bolting (23, 24) is employed, the drilling access difficulty is avoided, but it involves the provision of bolt-holes in the bearer webs at their most vulnerable point (i.e. remote from the neutral axis of the bearer section) and if these bolt-holes, as fractional remedy for this weakness, are made no larger than is compatible with placement of the U-bolts, some degree of inconvenience in performing that placement is inescapable.

The object of this invention is to remedy the shortcomings, itemised above as (A) to (E), in a simple manner, by the provision of a bearer by which:

(a) Easy access is provided for drilling of holes for the fastenings by which the decking members are secured to the bearers.

(b) The effective load support span (laterally of the decking) of the bearers is greater than the similar span of the chassis members; not greatly, but substantially and valuably.

(c) The vertical axes of maximum load intensity, directed downwardly by the bearers intersects, or virtually intersects, the vertical shear centres of the chassis members.

(d) In the event of strain on the part of the bearers, due to cantilever strain of the overhung decking portions, the top flanges of the bearers remain in surface contact with the decking members.

(e) Holes in the bearer webs, for acceptance of U-bolts, pierce those webs at or near the neutral axes of the bearer sections thus causing virtually no structural impairment of the bearers, and thus permitting, if desired, the holes to be considerably over-sized so to facilitate placement of the U-bolts.

SUMMARY OF THE INVENTION

The invention provides a vehicle decking bearer consisting of:

a Z-section runner comprising a vertical web and two horizontal flanges extending oppositely from the respective longitudinal edges of the web, and a plurality of bolting stations selectively spaced longitudinally of the runner, each of said stations comprising a bolt-hole formed in said web substantially at the neutral axis of the runner, and a bridge member fixed to said runner and having a flat U-bolt bearing surface the plane of which rectangularly intersects said bolt-hole.

Two examples of the invention are illustrated in FIGS. 3 to 7 of the drawings herewith.

Figure 3:
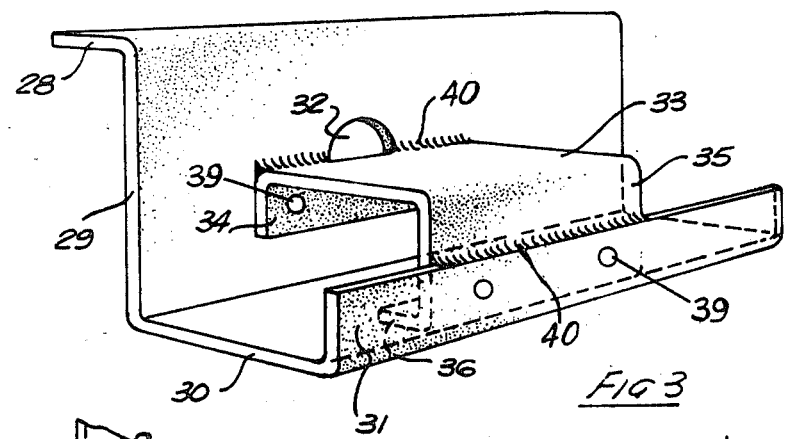

FIG. 3 is a portion of a runner and one of its bolting stations, in perspective.

Figure 4:
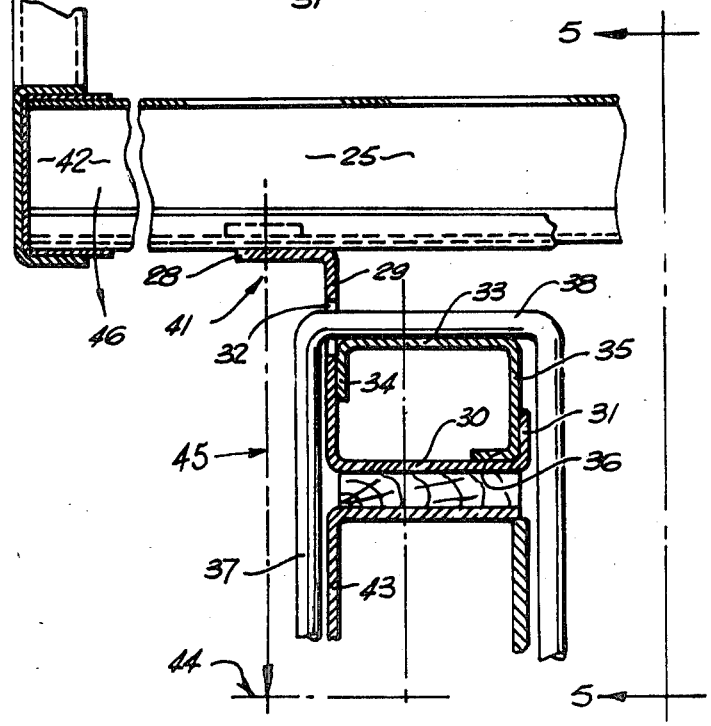

FIG. 4 is a sectional end elevation showing a bearer supporting a decking and U-bolted to a chassis member.

FIG. 5 is a side elevation looking in the direction of line 5—5 in FIG. 4.

FIG. 6 is a view similar to FIG. 3 showing a minor modification.

FIG. 7 is a sectional end elevation taken on line 7—7 in FIG. 6.

DETAILED DESCRIPTION OF THE DRAWINGS

Referring to FIGS. 3 to 5, the decking consists of a plurality of channels 25 laid side-by-side. The channel flanges have interfitting male and female formations (26 and 27). The decking channels 25 are bolted or riveted, by way of the flange formations 26 and 27, to the top outwardly projecting flange 28 of the bearer runner which is of Z-section, consisting of web 29 and oppositely directed top flange 28 and bottom 30. Flange 30 preferably extends into an up-turned sub-flange 31.

The runners each have a plurality of bolting stations selectively spaced longitudinally of the runner and each of these stations consists of a bolt-hole 32 substantially in the region of the neutral axis of the Z-section. A bridge member is of inverted channel section and consists of flat web 33, flanges 34 and 35, and if desired, a sub-flange as indicated at 36. The flange 35 preferably rests on the bottom flange 30 of the runner either directly or by way of a sub-flange such as 36. The plane of the flat upper surface of the bridge member web 33 rectangularly intersects the bolt-hole 32, thus ensuring ample mechanical clearance for a U-bolt 37. This effectively ensures that the upper surface of web 33 acts as a bearing surface for the crotch portion 38 of the U-bolt. It will be noticed that the hole 32 is considerably larger than is necessary merely to provide mechanical clearance for insertion of the U-bolt. This over-sizing of the bolt-hole is permissible because the hole is in or near the neutral axis of the Z-section and is desirable to facilitate placement of the U-bolt in the hole such as 32. One leg of the U-bolt may easily be inserted in the hole with the U-bolt in its entirety virtually resting on the web 33. The U-bolt may then be easily turned and its legs allowed to fall so that it assumes bolting position as shown in FIGS. 4 and 5. It will be appreciated that the bridge member may be secured in relation to the runner in any convenient way. For example, by rivets indicated at 39 or welding as indicated at 40, or both.

With regard to the advantages of the present invention itemised above as (a) to (e), it will be seen that, with regard to (a), holes for application of bolts or rivets to hold the decking members 25 to the flanges 28 can be formed with full drilling accessibility, the location of the required holes being on the axis indicated at 41, that is, on the outer side of the runners.

Figure 1:
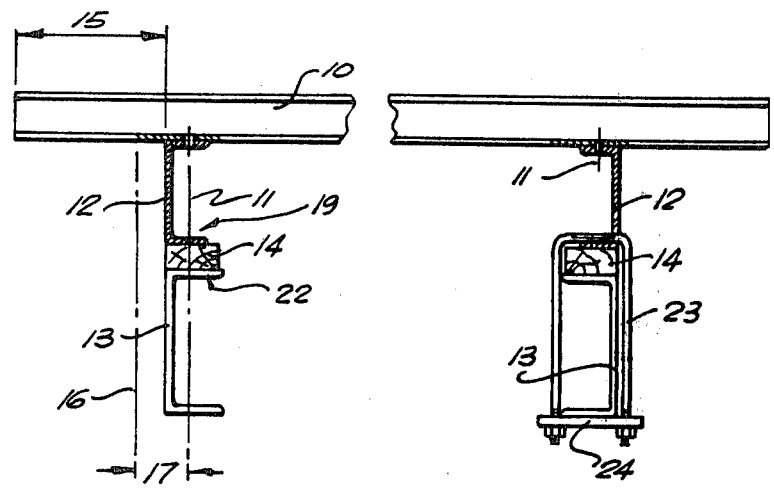
FIGS. 1 and 2 are schematic showing of prior art.
Figure 2:
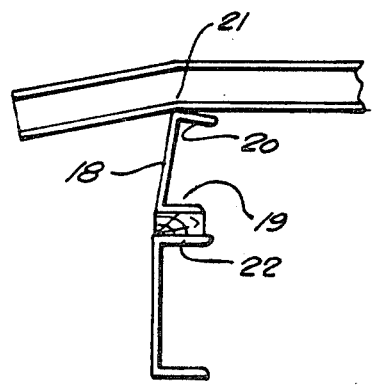

With regard to (b), it will be seen that as the flanges 28 are turned outwardly (instead of inwardly as shown at 20 in FIG. 2), the cantilever over-hung portions 42 of the decking members is reduced by the width of the bearer top flange 28.

With regard to (c) and referring to FIG. 4, the vertical shear centre of the chassis member 43 is located at the point 44 and thus is intersected by the axis (41) of maximum load intensity.

With regard to (d), it has been found that in the event of cantilever failure of decking parts 42, FIG. 4 the bend line of the failure is in the vicinity of the junction of the bearer flange 28 and the web 29 (in the direction of the line indicated at 45) and when cantilever strain occurs (in the direction of arrow 46), it is found that the flange 28 bends with the decking members and thus remains flatly in surface contact with the underfaces of those members.

Referring to FIGS. 6 and 7, the arrangement there shown is virtually the same as that already described except that the bridge member has its "web-side" flange 34A extended downwardly to the runner flange 30A and also has an extra sub-flange 47. With this arrangement there is less need for the bridge member to be fixedly secured to the runner (48). The bridge member may be riveted or welded (or both riveted and welded) to the runner as previously explained, however in some cases it may be sufficient merely to make the flanges 34A and 35A firm-fitting between the web 29A and the sub-flange 31A and simply secure the bridge member to the runner by hammer-tapping it into the required position.

I claim:

1. A bearer for use in a vehicle of the kind wherein a decking is supported on a pair of said bearers which in turn respectively rest upon and are parallel to a pair of chassis members forming a part of the vehicle structure and extending longitudinally, comprising a Z-section runner having:
   a. An upright web, having selectively longitudinally spaced bolt holes at locations in a neutral axis of said runner,
   b. A top horizontal flange extending from the top longitudinal edge of said upright web, for orientation outward of said vehicle,
   c. A bottom horizontal flange extending from the bottom longitudinal edge of said upright web for orientation inward of said vehicle,
   d. A bridge member fixed to the inner side of said upright web and over said bottom horizontal flange having a flat U-bolt bearing surface, the plane of which rectangularly intersects said bolt hole in said upright web.

2. A bearer according to claim 1 wherein said bridge member is of inverted channel cross-sectional shape and incorporates one flange by which the bridge member is fixedly secured to the web of said runner, and a second flange which rests on the bottom flange of said runner.

3. A bearer according to claim 2 wherein said second flange rests directly upon said bottom flange.

4. A bearer according to claim 2 wherein said second flange rests upon said bottom flange by way of a sub-flange on the distal longitudinal edge of said second flange.

5. A bearer according to claim 1 wherein said bridge member is of inverted channel cross-sectional shape and incorporates two flanges both of which rest upon the bottom flange of said runner.

6. A bearer according to claim 5 wherein at least one of said bridge member flanges rests directly upon said bottom flange.

7. A bearer according to claim 5 wherein at least one of said bridge member flanges rests upon said bottom flange by way of a sub-flange on the distal longitudinal edge of the bridge member flange.

* * * * *